United States Patent
Hwang et al.

(10) Patent No.: US 9,515,993 B1
(45) Date of Patent: Dec. 6, 2016

(54) AUTOMATED MIGRATION PLANNING FOR MOVING INTO A SETTING OF MULTIPLE FIREWALLS

(71) Applicant: International Business Machines Corporation, Armonk, NY (US)

(72) Inventors: Jinho Hwang, Ossining, NY (US); Jill L. Jermyn, Stony Brook, NY (US); Harigovind V. Ramasamy, Ossining, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 14/710,791

(22) Filed: May 13, 2015

(51) Int. Cl.
  *H04L 29/06* (2006.01)
  *H04L 29/08* (2006.01)
  *H04L 12/26* (2006.01)
  *G06F 17/30* (2006.01)

(52) U.S. Cl.
  CPC ..... *H04L 63/0263* (2013.01); *G06F 17/30958* (2013.01); *H04L 43/045* (2013.01); *H04L 67/10* (2013.01)

(58) Field of Classification Search
  CPC .............................. H04L 67/10; H04L 43/045
  See application file for complete search history.

(56) References Cited

U.S. PATENT DOCUMENTS

| | | | |
|---|---|---|---|
| 8,127,347 B2 | 2/2012 | Xiao | |
| 8,132,248 B2 | 3/2012 | Trojanowski | |
| 8,417,938 B1 | 4/2013 | Considine et al. | |
| 9,328,382 B2 * | 5/2016 | Drmanac | C12Q 1/6869 |
| 2009/0016355 A1 * | 1/2009 | Moyes | H04L 45/02 370/395.31 |
| 2009/0097418 A1 * | 4/2009 | Castillo | H04L 41/12 370/255 |
| 2011/0302291 A1 * | 12/2011 | Draugelis | G06F 21/55 709/224 |
| 2012/0036093 A1 * | 2/2012 | Gleason | G06N 99/005 706/12 |

(Continued)

OTHER PUBLICATIONS

Alpert, Charles et al.; "Spectral partitioning with multiple eigenvectors"; Discrete Applied Mathematics 90; 1993; pp. 3-26; Copyright 1999; Published y Elsevier Science B.V.

*Primary Examiner* — Hadi Armouche
*Assistant Examiner* — Ali Shayanfar
(74) *Attorney, Agent, or Firm* — Edward P. Li

(57) ABSTRACT

A method, a computer program product, and a computer system for automatically migrating servers into an environment of multiple firewalls. A computer creates a graph representing the servers and connectivity, based on connectivity strengths and resource requirements. The computer groups the servers into multiple groups by using a graph based partitioning algorithm which considers the connectivity strengths and the resource requirements. The computer creates two adjacency matrices, one for local rules and the other for global rules. The computer adds endpoints to a local adjacency list, in response to determining that the endpoints are in a respective one of the multiple groups. The computer adds endpoints to a global adjacency list, in response to determining that the endpoints are not in respective one of the multiple groups. The computer converts the adjacency lists to firewall rules for the respective one of the multiple groups.

15 Claims, 7 Drawing Sheets

(56) References Cited

U.S. PATENT DOCUMENTS

| | | |
|---|---|---|
| 2012/0317636 A1 | 12/2012 | Mishina et al. |
| 2013/0083693 A1* | 4/2013 | Himura ............... H04L 12/4641 370/254 |
| 2013/0086063 A1* | 4/2013 | Chen ................. G06F 17/30595 707/736 |
| 2013/0298184 A1* | 11/2013 | Ermagan ................. G06F 21/54 726/1 |
| 2014/0068698 A1 | 3/2014 | Burchfield et al. |
| 2014/0149494 A1 | 5/2014 | Markley et al. |
| 2014/0245423 A1 | 8/2014 | Lee |
| 2014/0323316 A1* | 10/2014 | Drmanac ............. C12Q 1/6806 506/2 |
| 2015/0309507 A1* | 10/2015 | Murai ................ G05B 23/0283 700/79 |

* cited by examiner

AUTOMATED MIGRATION PLANNING FOR MOVING INTO A SETTING OF MULTIPLE FIREWALLS

TECHNICAL FIELD OF THE INVENTION

The present invention relates generally to computer networks, and more particularly to automated migration planning for moving into a setting of multiple firewalls.

BACKGROUND

In migrating hundreds and thousands of servers into the cloud, due to the resource limitation in a POD (Point of Delivery) design, the migration will result in multiple PODs, possibly across multiple data centers. A POD is a module of network, compute, storage, and application components that work together to deliver networking services. Each of the multiple PODs should have a firewall. In migrating servers into the cloud, the servers are grouped into multiple groups, each of which can be fitted into a single POD; therefore, a firewall for the servers is migrated into multiple firewalls for the PODs. In the migration process, the firewall rules for the single firewall are migrated into new firewall rules for different PODs.

SUMMARY

In one aspect, a method for automatically migrating servers into an environment of multiple firewalls is provided. The method is implemented by a computer. The method includes creating a graph representing the servers and connectivity, based on connectivity strengths and resource requirements. The method further includes grouping the servers into multiple groups by using a graph based partitioning algorithm which considers the connectivity strengths and the resource requirements. The method further includes creating first adjacency matrix and second adjacency matrix for the servers in a respective one of the multiple groups, wherein the first adjacency matrix is for local rules and the second adjacency matrix is for global rules. The method further includes adding a respective one of endpoints to a local adjacency list, in response to determining that the respective one of the endpoints is in the respective one of the multiple groups. The method further includes adding the respective one of the endpoints to a global adjacency list, in response to determining that the respective one of the endpoints is not in the respective one of the multiple groups. The method further includes converting the local adjacency list and the global adjacency list to firewall rules for the respective one of the multiple groups.

In another aspect, a computer program product for automatically migrating servers into an environment of multiple firewalls is provided. The computer program product comprises a computer readable storage medium having program code embodied therewith. The program code is executable to: create a graph representing the servers and connectivity, based on connectivity strengths and resource requirements; group the servers into multiple groups by using a graph based partitioning algorithm which considers the connectivity strengths and the resource requirements; create first adjacency matrix and second adjacency matrix for the servers in a respective one of the multiple groups, wherein the first adjacency matrix is for local rules and the second adjacency matrix is for global rules; add a respective one of endpoints to a local adjacency list, in response to determining that the respective one of the endpoints is in the respective one of the multiple groups; add the respective one of the endpoints to a global adjacency list, in response to determining that the respective one of the endpoints is not in the respective one of the multiple groups; and convert the local adjacency list and the global adjacency list to firewall rules for the respective one of the multiple groups.

In yet another aspect, a computer system for automatically migrating servers into an environment of multiple firewalls is provided. The computer system comprises one or more processors, one or more computer readable tangible storage devices, and program instructions stored on at least one of the one or more computer readable tangible storage devices for execution by at least one of the one or more processors. The program instructions are executable to create a graph representing the servers and connectivity, based on connectivity strengths and resource requirements. The program instructions are executable to group the servers into multiple groups by using a graph based partitioning algorithm which considers the connectivity strengths and the resource requirements. The program instructions are executable to create first adjacency matrix and second adjacency matrix for the servers in a respective one of the multiple groups, wherein the first adjacency matrix is for local rules and the second adjacency matrix is for global rules. The program instructions are executable to add a respective one of endpoints to a local adjacency list, in response to determining that the respective one of the endpoints is in the respective one of the multiple groups. The program instructions are executable to add the respective one of the endpoints to a global adjacency list, in response to determining that the respective one of the endpoints is not in the respective one of the multiple groups. The program instructions are executable to convert the local adjacency list and the global adjacency list to firewall rules for the respective one of the multiple groups.

DETAILED DESCRIPTION

Embodiments of the present invention provides an approach for automatically migrating servers into a multiple firewalls environment by minimizing the number of entries to the firewalls based on connectivity. The approach comprises grouping servers into multiple groups, based on the strength of connections to minimize the inter-group connectivity and maximize the intra-group connectivity; therefore, the approach can achieve better performance, reduced cost to set the firewall rules, save network bandwidth, and achieve high efficiency. The approach further comprises automatically generating global and local firewall rules (i.e., inbound and outbound) for each firewall of each group, based on the graph connectivity. The approach further comprises returning a list of fire walls that can be directly be applied to firewalls of the groups.

In migrating servers into the cloud in a POD (Point of Delivery) design and planning on the firewall rules of multiple firewalls of multiple groups or PODs, embodiments of the present invention minimize the firewall entries, so that the communication between firewalls is minimized and thus performance is improved. Embodiments of the present invention automate the process to divide one firewall into multiple firewalls while minimizing the cross traffic between firewalls.

Figure 1:
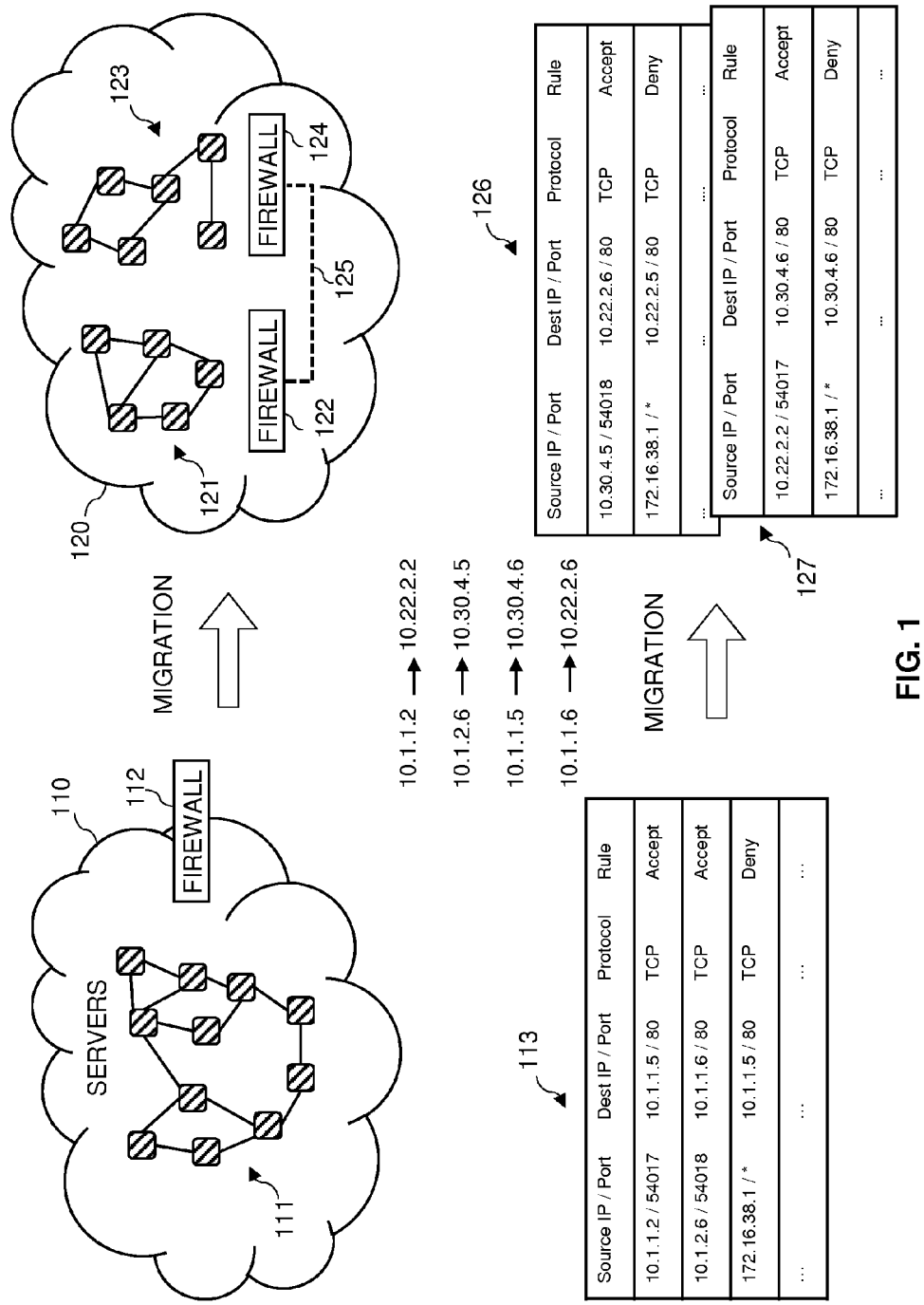
FIG. 1 is a diagram showing a migration of servers into one data center in a POD design, in accordance with one embodiment of the present invention.

FIG. 1 is a diagram showing a migration of servers into one data center in a POD design, in accordance with one embodiment of the present invention. Cloud 110 includes servers 111 which represent hundreds and thousands of servers in a cloud environment. As shown in FIG. 1, cloud 110 comprises one firewall—firewall 112. In migrating servers 111 into cloud 120 which is in a POD design, servers 111 are grouped into two groups: POD 121 and POD 123. POD 121 has firewall 122 and POD 123 has firewall 124. Embodiments of the present invention provide an approach to minimize the communication (denoted by numeral 125) between firewalls 122 and 124. As an example, table 113 shows source IP addresses and ports, destination addresses and ports, protocols, and rules for servers 111; table 126 shows source IP addresses and ports, destination addresses and ports, protocols, and rules for servers in POD 121; and table 127 shows source IP addresses and ports, destination addresses and ports, protocols, and rules for servers in POD 123.

Figure 2:
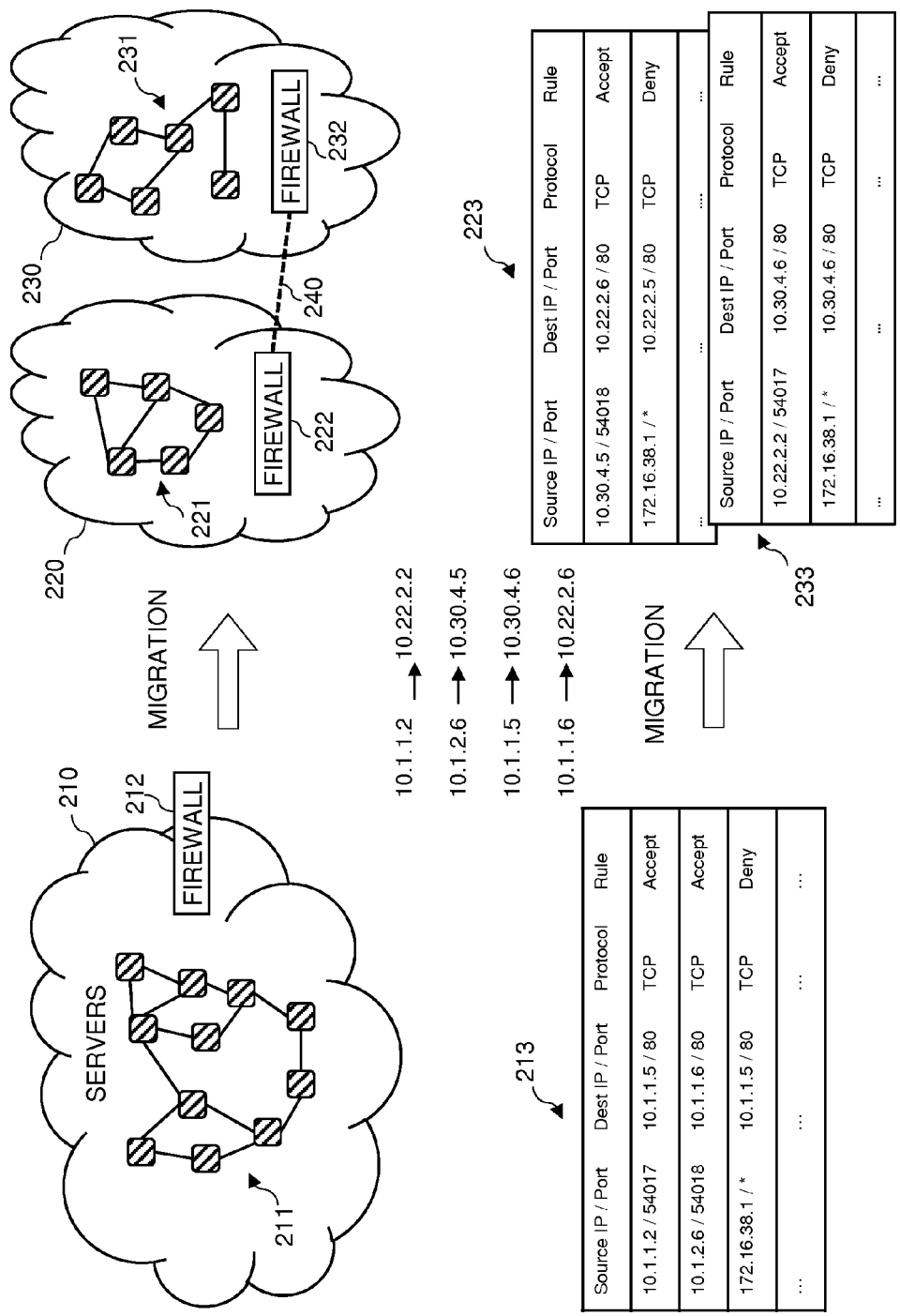
FIG. 2 is a diagram showing a migration of servers into multiple data centers in a POD design, in accordance with one embodiment of the present invention.

FIG. 2 is a diagram showing a migration of servers into multiple data centers in a POD design, in accordance with one embodiment of the present invention. Cloud 210 includes servers 211 which represent hundreds and thousands of servers in a cloud environment. Cloud 210 comprises one firewall—firewall 212. In migrating servers 211 into cloud 220 and cloud 230 (or multiple data centers), servers 211 are grouped into two groups: POD 221 in cloud 220 and POD 231 in cloud 230. POD 221 has firewall 222, and POD 231 has firewall 232. Embodiments of the present invention provide an approach to minimize the communication (denoted by numeral 240) between firewall 222 and firewall 232. Shown as an example, table 213 shows source IP addresses and ports, destination addresses and ports, protocols, and rules for servers 211. In the same example, tables 223 and 233 show source IP addresses and ports, destination addresses and ports, protocols, and rules after the migration, respectively for POD 221 and POD 231.

Figure 3:
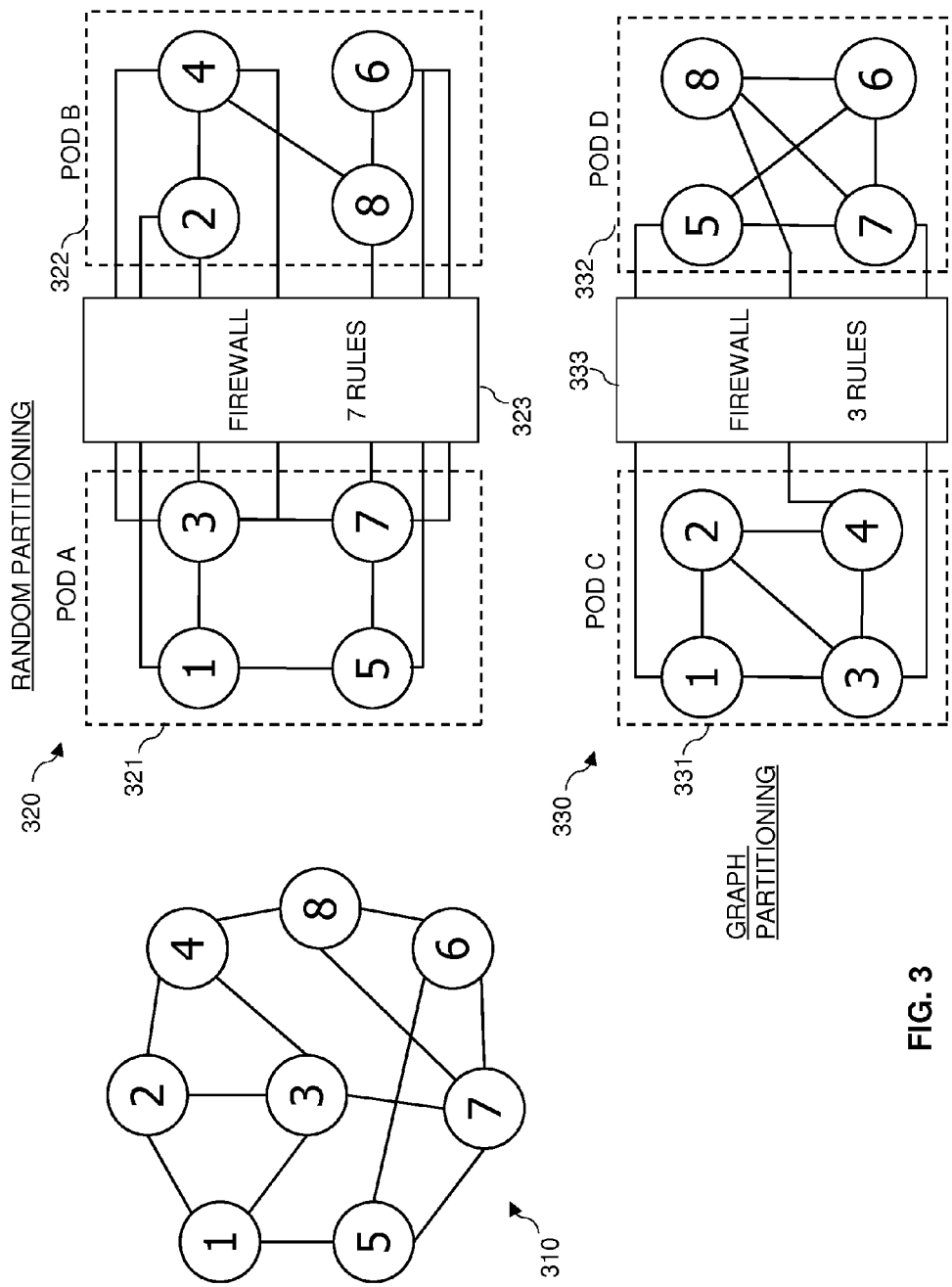
FIG. 3 shows examples of partitioning of servers, in accordance with one embodiment of the present invention.

In the present invention, grouping servers into multiple groups (or PODs) uses a graph based partitioning algorithm. FIG. 3 shows examples of partitioning of servers, in accordance with one embodiment of the present invention. The examples are presented for purposes of illustration and description; they do not imply any limitation with regard to the environments in which different embodiments may be implemented. The examples do not imply any limitation of the number of servers in a cloud environment or in a POD. FIG. 3 shows random partitioning 320. In the random partitioning, servers 310 are grouped into POD A (within a dashed line block which is denoted by numeral 321) and POD B (within a dashed line block which is denoted by numeral 322). Firewall 323 between POD A and POD B needs 7 rules. FIG. 3 shows graph partitioning 330, which use the graph based partitioning algorithm. In the graph partitioning, servers 310 are grouped into POD C (within a dashed line block which is denoted by numeral 331) and POD D (within a dashed line block which is denoted by numeral 332). Firewall 333 between POD C and POD D needs 3 rules, because the graph based petition algorithm is used. In migrating servers into a cloud in a POD design, using the graph based petition algorithm to group the servers minimize the inter-group connectivity and maximize the intra-group connectivity.

The graph based partitioning algorithm relies on an entire graph and does not rely on an arbitrary initial partition. In an embodiment, a spectral partitioning is used, in which a partition is derived from a spectrum of an adjacency matrix. A graph (such as a graph representing servers 310 in FIG. 3) can be represented by an adjacency matrix A, where an entry $A_{ij}$ implies an edge between node i and j of the graph. In a degree matrix D, which is a diagonal matrix, each diagonal entry of a row i, $d_{ii}$, represents the node degree of node i. The Laplacian of the matrix L is defined as L=D−A. Now, a ratio-cut partition for graph G=(V, E) is defined as a partition of V into disjoint U and W, such that cost of cut (U,W)/(|U|·|W|) is minimized. In such a scenario, the second smallest eigenvalue ($\lambda$) of L yields a lower bound on the optimal cost (c) of ratio-cut partition with $c \geq \lambda/n$. The eigenvector corresponding to $\lambda$, called the Fiedler vector, bisects the graph into only two communities based on the sign of the corresponding vector entry. Division into a larger number of communities is usually achieved by repeated bisection, but this does not always give satisfactory results. However, when the number of communities to be partitioned or the partition sizes are unknown, minimum cut partitioning fails. For instance, optimizing the cut size for free group sizes puts all vertices in the same community. Additionally, cut size may be the wrong thing to minimize since a good division is not just one with small number of edges between communities. In the present invention, to resolve this problem, modularity (Q) is used as a metric to optimize a balanced graph partition. Modularity is one measure of the structure of a graph. It was designed to measure the strength of division of a network into modules (also called groups, clusters or communities).

Figure 4:
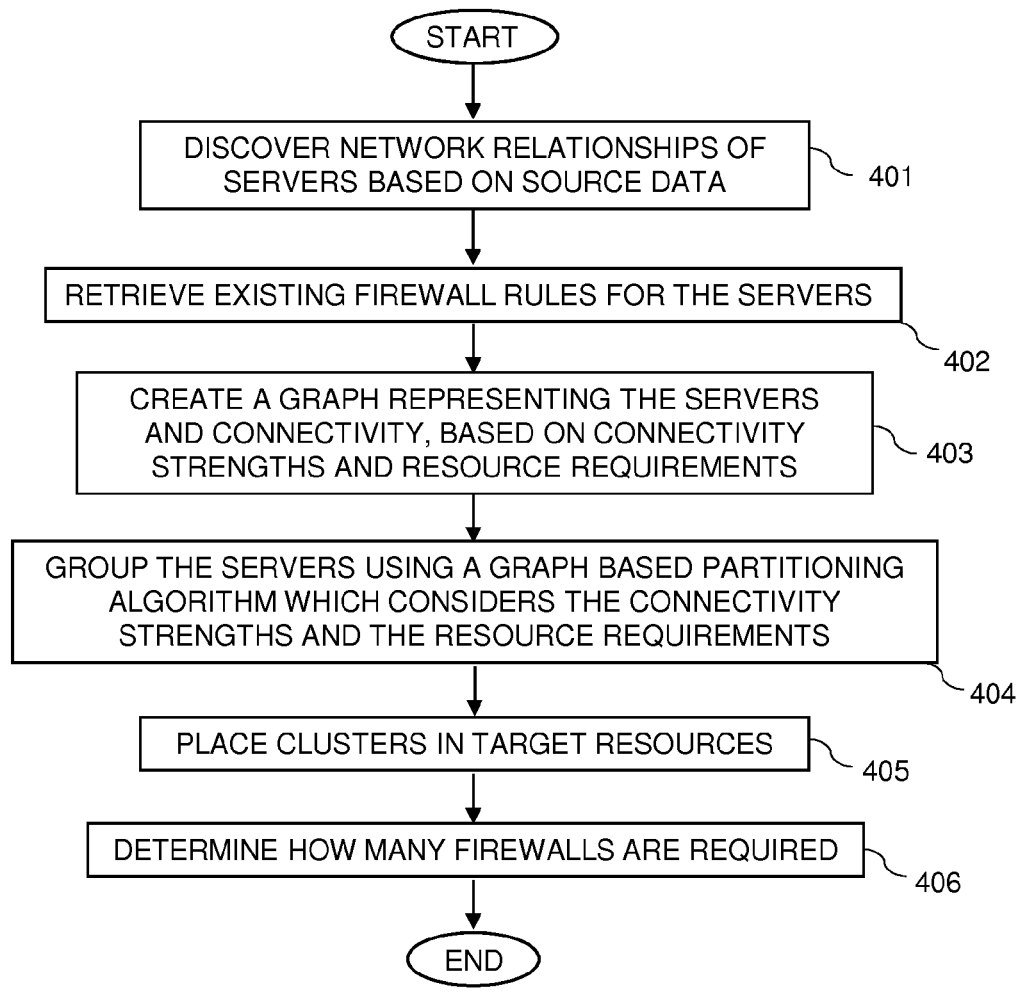
FIG. 4 is a flowchart showing operational steps for grouping servers and allocating resources, in accordance with one embodiment of the present invention.

FIG. 4 is a flowchart showing operational steps for grouping servers and allocating resources, in accordance with one embodiment of the present invention. At step 401, a computer discovers network relationships of servers, based on given source data. At step 402, the computer retrieves existing firewall rules for the servers. At step 403, the computer creates a graph which represents the servers and connectivity of the servers, based on connectivity strengths and resource requirements. At this step, the computer may create a graph, in which each of server is denoted by a node and the connectivity of the servers is denoted by edges connecting the nodes. The graph representing servers 310 in FIG. 3 illustrates this type of the graph. At step 404, the computer groups the servers, using a graph based partitioning algorithm which considers the connectivity strength and the resource requirements. As described in previous paragraphs, the graph based partitioning algorithm minimizes the inter-group connectivity and maximize the intra-group connectivity; therefore, the communication between firewalls of PODs is minimized.

Referring to FIG. 4, at step 405, the computer places clusters in target resources. For example, as shown in FIG. 3, a cluster including server 1, 2, 3, and 4 is placed in POD C 331, and another cluster including 5, 6, 7, and 8 in POD D 332. At step 406, the computer determines how many firewalls are required. For example, each POD needs a firewall.

Figure 5:
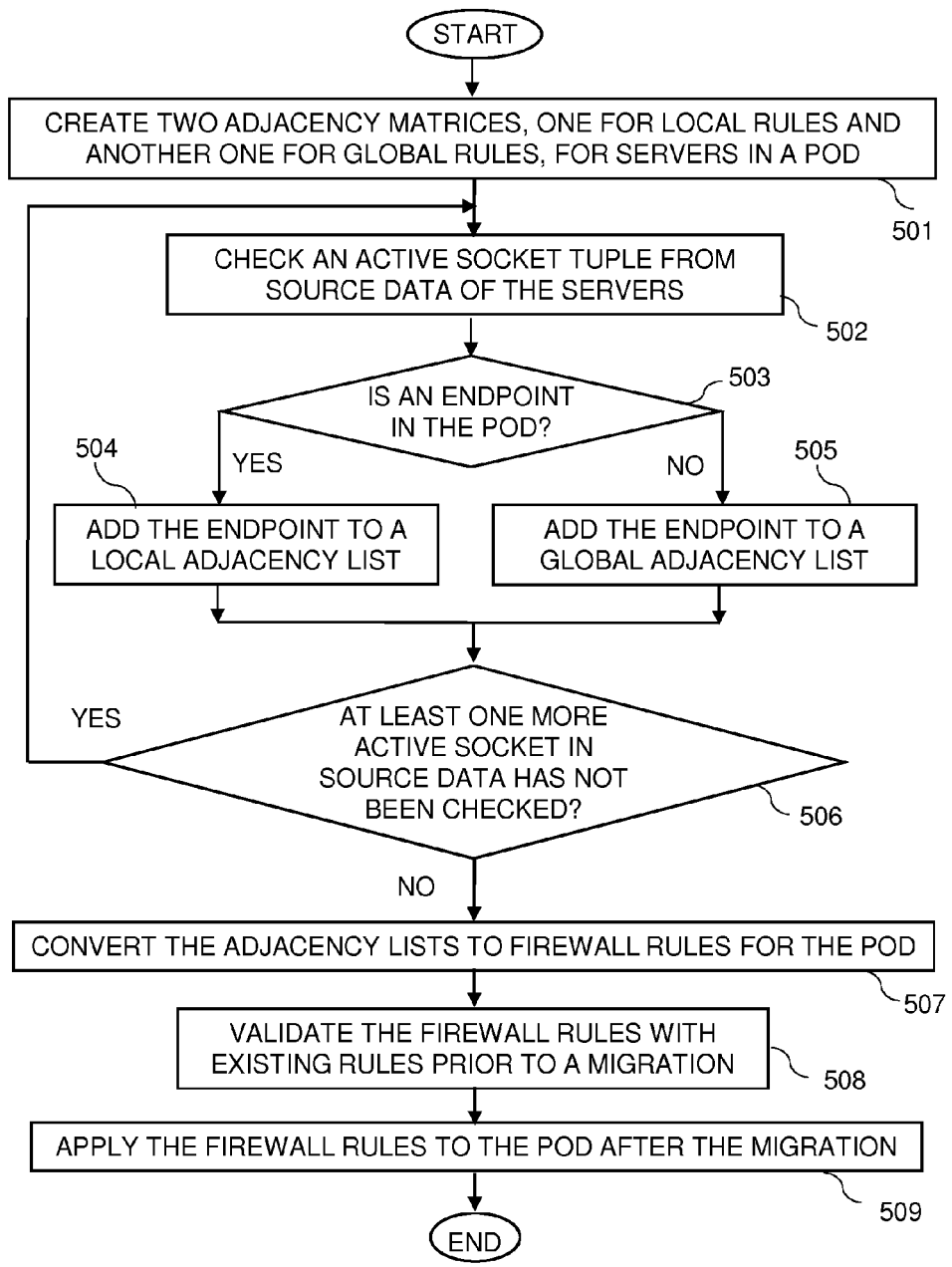
FIG. 5 is a flowchart showing operational steps for generating firewall rules for a firewall of a POD, in accordance with one embodiment of the present invention.

Through steps presented in FIG. 4, servers are grouped into multiple groups or PODs. Now, the computer automatically generates generating global and local firewall rules (i.e., inbound and outbound) for each firewall of each group, based on the graph connectivity. FIG. 5 is a flowchart showing operational steps for generating firewall rules for a firewall of a POD, in accordance with one embodiment of the present invention. At step 501, the computer creates two adjacency matrices for server in a POD. One of the two adjacency matrices is for local rules, and the other is for global rules. At step 502, the computer checks an active socket tuple from source data of the servers in the POD. At decision block 503, the computer determines whether an endpoint is in the POD. The endpoint is a combination of an IP address and a port number.

Figure 6:
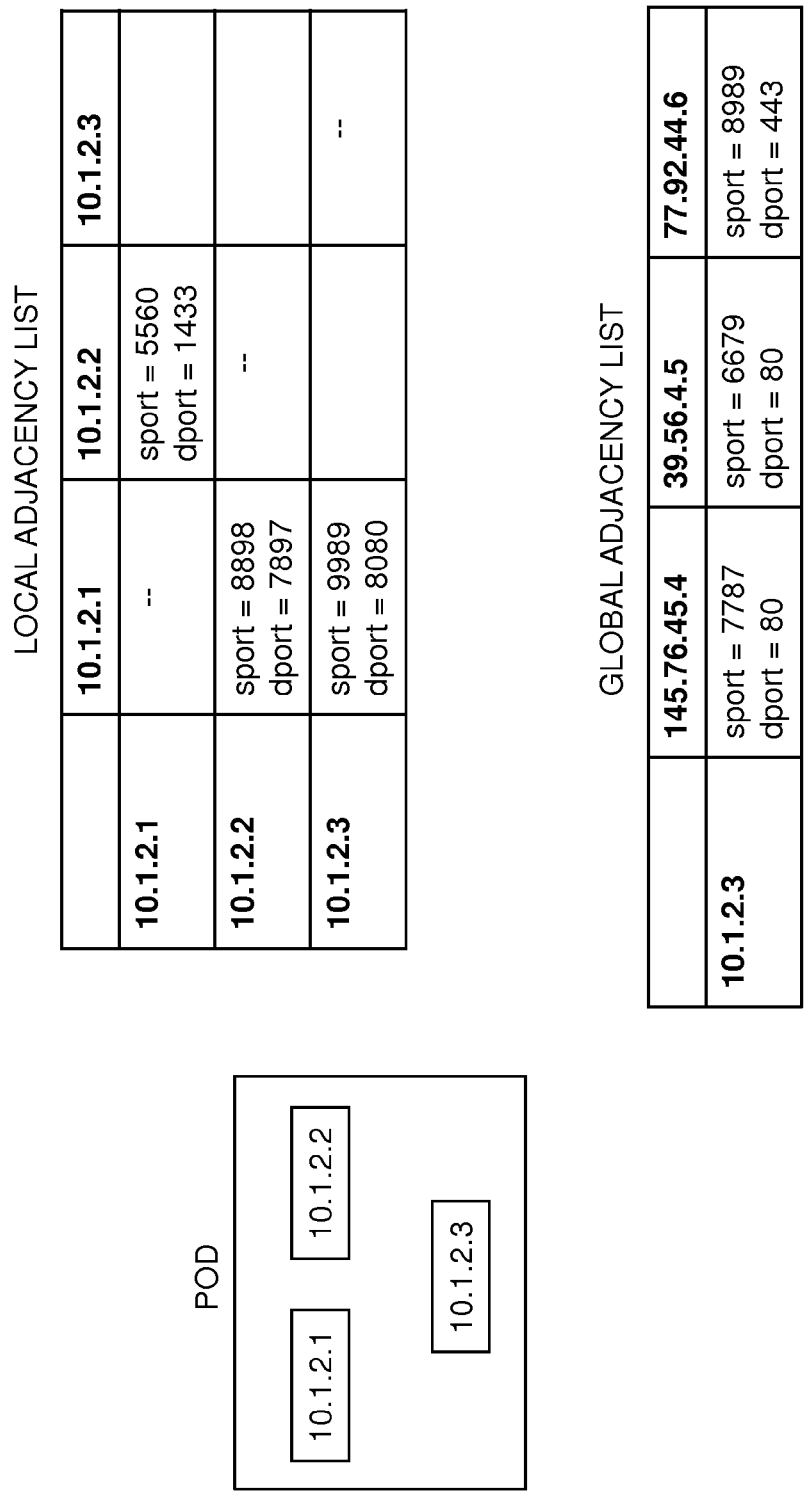
FIG. 6 shows an example of local and global adjacent lists, in accordance with one embodiment of the present invention.

In response to determining that the endpoint is in the POD (YES branch of decision block 503), at step 504, the computer adds the endpoint to a local adjacency list. In response to determining that the endpoint is not in the POD (NO branch of decision block 503), at step 505, the computer adds the endpoint to a global adjacency list. An example of local and global adjacent lists for a POD is shown in FIG. 6.

After step 504 or step 505, at decision block 506, the computer determines whether at least one more active socket in the source data has not been checked. In response to determining that the least one more active socket in the source data has not been checked (YES branch of decision block 506), the computer reiterates from step 502. In response to determining that all active sockets in the source data have been checked (NO branch of decision block 506), at step 507, the computer converts the adjacency lists (the local adjacent list and the global adjacent list) to firewall rules for the POD. At step 508, the computer validates the firewall rules for the POD, prior to a migration in which servers are migrated into a multiple firewalls environment. At this step, the computer validates the firewall rules with existing source firewall rules to find any special rules, missing rules, or redundant rules. At step 509, the computer applies the firewall rules to the POD, after migrating the servers into a multiple firewalls environment.

Figure 7:
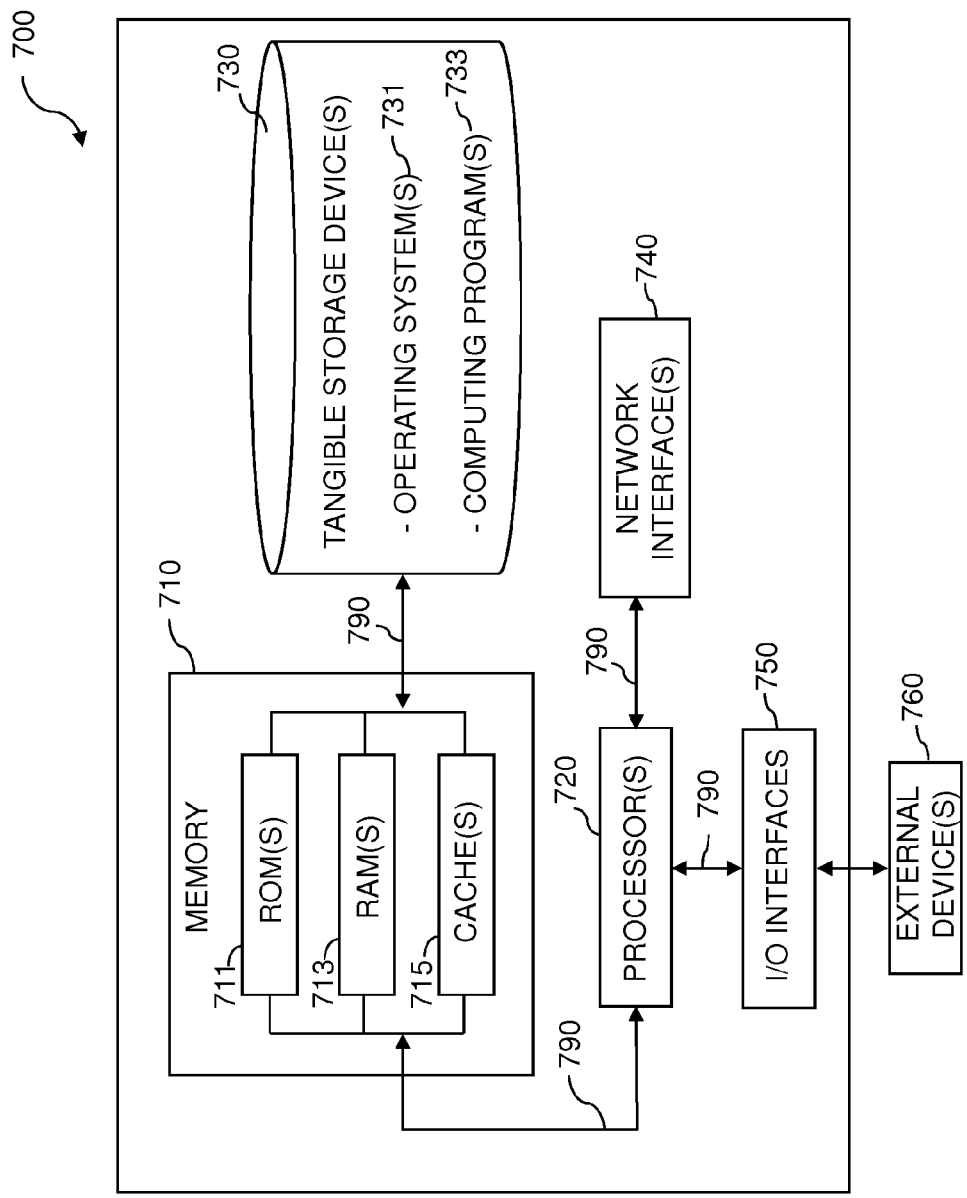
FIG. 7 is a diagram illustrating components of a computer device hosting one or more computer programs for grouping servers, allocating resources, and generating firewall rules, in accordance with one embodiment of the present invention.

FIG. 7 is a diagram illustrating components of computer device 700 hosting one or more computer programs for grouping servers, allocating resources, and generating firewall rules, in accordance with one embodiment of the present invention. It should be appreciated that FIG. 7 provides only an illustration of one implementation and does not imply any limitations with regard to the environment in which different embodiments may be implemented.

Referring to FIG. 7, computer device 700 includes processor(s) 720, memory 710, and tangible storage device(s) 730. In FIG. 7, communications among the above-mentioned components of computing device 700 are denoted by numeral 790. Memory 710 includes ROM(s) (Read Only Memory) 711, RAM(s) (Random Access Memory) 713, and cache(s) 715. One or more operating systems 731 and one or more computer programs 733 reside on one or more computer readable tangible storage device(s) 730. The computer programs for grouping servers, allocating resources, and generating firewall rules resides on one or more computer readable tangible storage device(s) 730. Computing device 700 further includes I/O interface(s) 750. I/O interface(s) 750 allows for input and output of data with external device(s) 760 that may be connected to computing device 700. Computing device 700 further includes network interface(s) 740 for communications between computing device 700 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for automatically migrating servers into an environment of multiple firewalls, the method comprising:
    creating, by a computer, a graph representing the servers and connectivity, based on connectivity strengths and resource requirements;
    grouping, by the computer, the servers into multiple groups by using a graph based partitioning algorithm which considers the connectivity strengths and the resource requirements;
    creating, by the computer, first adjacency matrix and second adjacency matrix for the servers in a respective one of the multiple groups, wherein the first adjacency matrix is for local rules and the second adjacency matrix is for global rules;
    adding, by the computer, a respective one of endpoints to a local adjacency list, in response to determining that the respective one of the endpoints is in the respective one of the multiple groups;
    adding, by the computer, the respective one of the endpoints to a global adjacency list, in response to determining that the respective one of the endpoints is not in the respective one of the multiple groups;
    converting, by the computer, the local adjacency list and the global adjacency list to firewall rules for the respective one of the multiple groups;
    validating, by the computer, the firewall rules for the respective one of the multiple groups, prior to migrating the servers into the environment of the multiple firewalls; and
    applying, by the computer, the firewall rules to the respective one of the multiple groups, after migrating the servers into the environment of the multiple firewalls.

2. The method of claim 1, further comprising:
    retrieving, by the computer, existing firewall rules for the servers.

3. The method of claim 1, further comprising:
    checking, by the computer, each active socket tuple from source data of the servers.

4. The method of claim 1, further comprising:
    determining, by the computer, how many firewalls are required for the environment of the multiple firewalls.

5. The method of claim 1, wherein modularity is used as a metric in using the graph based partitioning algorithm.

6. A computer program product for automatically migrating servers into an environment of multiple firewalls, the computer program product comprising a computer readable storage medium having program code embodied therewith, the program code executable to:
    create a graph representing the servers and connectivity, based on connectivity strengths and resource requirements;
    group the servers into multiple groups by using a graph based partitioning algorithm which considers the connectivity strengths and the resource requirements;
    create first adjacency matrix and second adjacency matrix for the servers in a respective one of the multiple groups, wherein the first adjacency matrix is for local rules and the second adjacency matrix is for global rules;
    add a respective one of endpoints to a local adjacency list, in response to determining that the respective one of the endpoints is in the respective one of the multiple groups;

add the respective one of the endpoints to a global adjacency list, in response to determining that the respective one of the endpoints is not in the respective one of the multiple groups;

convert the local adjacency list and the global adjacency list to firewall rules for the respective one of the multiple groups;

validate the firewall rules for the respective one of the multiple groups prior to migrating the servers into the environment of the multiple firewalls; and apply the firewall rules to the respective one of the multiple groups after migrating the servers into the environment of the multiple firewalls.

7. The computer program product of claim 6, further comprising the program code executable to:

retrieve existing firewall rules for the servers.

8. The computer program product of claim 6, further comprising the program code executable to:

check each active socket tuple from source data of the servers.

9. The computer program product of claim 6, further comprising the program code executable to:

determine how many firewalls are required for the environment of the multiple firewalls.

10. The computer program product of claim 6, wherein modularity is used as a metric in using the graph based partitioning algorithm.

11. A computer system for automatically migrating servers into an environment of multiple firewalls, the computer system comprising:

one or more processors, one or more computer readable tangible storage devices, and program instructions stored on at least one of the one or more computer readable tangible storage devices for execution by at least one of the one or more processors, the program instructions executable to:

create a graph representing the servers and connectivity, based on connectivity strengths and resource requirements group the servers into multiple groups by using a graph based partitioning algorithm which considers the connectivity strengths and the resource requirements;

create first adjacency matrix and second adjacency matrix for the servers in a respective one of the multiple groups, wherein the first adjacency matrix is for local rules and the second adjacency matrix is for global rules;

add a respective one of endpoints to a local adjacency list, in response to determining that the respective one of the endpoints is in the respective one of the multiple groups;

add the respective one of the endpoints to a global adjacency list, in response to determining that the respective one of the endpoints is not in the respective one of the multiple groups;

convert the local adjacency list and the global adjacency list to firewall rules for the respective one of the multiple groups;

validate the firewall rules for the respective one of the multiple groups prior to migrating the servers into the environment of the multiple firewalls; and apply the firewall rules to the respective one of the multiple groups after migrating the servers into the environment of the multiple firewalls.

12. The computer system of claim 11, further comprising the program instructions executable to:

retrieve existing firewall rules for the servers.

13. The computer system of claim 11, further comprising the program instructions executable to:

check each active socket tuple from source data of the servers.

14. The computer system of claim 11, further comprising the program instructions executable to:

determine how many firewalls are required for the environment of the multiple firewalls.

15. The computer system of claim 11, wherein modularity is used as a metric in using the graph based partitioning algorithm.

* * * * *